Patented Oct. 1, 1940

2,216,155

UNITED STATES PATENT OFFICE 2,216,155

ARYL AMINO COMPOUNDS

Frederick F. Blicke, Washtenaw County, Mich., assignor to The Regents of The University of Michigan, Ann Arbor, Mich., a body corporate of Michigan No Drawing. Application March 6, 1939,
Serial No. 260,175

23 Claims. (Cl. 260—472)

The invention relates to the preparation of aminoalkyl esters of naphthalene carboxylic acids having an amino group attached to the naphthalene nucleus.

The general formula for the compounds of the invention is,

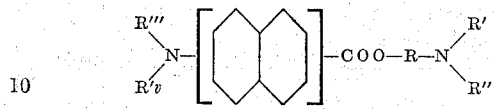

where R is an alkyl residue (having either a straight or branched carbon chain), and R', R", R''' and R'v are the same or different members of the group hydrogen and an alkyl group (either straight or branched carbon chain).

This application is a continuation-in-part of my copending application, Serial No. 186,732, filed January 24, 1938.

The compounds of the invention are valuable for their physiological properties, especially their anesthetic properties. They may also serve as intermediates for the preparation of other pharmaceutically valuable compositions.

The new compounds can be made by various methods. For example, a nitro-naphthoic acid is converted into its acid halide,

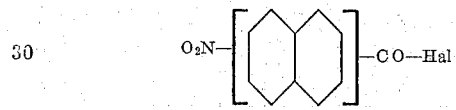

and the latter compound reacted with an amino alkanol,

(R, R' and R" having the same significance as already given above), to obtain a nitro-substituted ester,

This nitro ester is then reduced at its nitro group to an amino compound of the new type.

In order to obtain compounds where the amino group attached to the naphthalene nucleus is substituted by one or more alkyl groups, and also where unsubstituted, other more convenient methods can be used. For example, a naphthoic acid substituted in the nucleus by an amino-, a monoalkylamino-, or dialkylamino-group can be esterified by any of the usual methods in order to replace the hydrogen of the carboxylic acid group with an aminoalkyl radical, obtained for instance from an amino-substituted alcohol. In such cases, the amino naphthoic acid can be esterified with an amino alcohol, or the alkali salt of the amino naphthoic acid may be reacted with the corresponding amino-substituted alkyl halide.

One may also replace the acidic hydrogen atom of an amino naphthoic acid, carrying a nuclear unsubstituted amino group, by an aminoalkyl radical, using any of the known esterification reactions, and, if desired, subsequently treat the amino naphthoic acid ester with an alkyl halide or other alkylating agent to replace one or more of the amino hydrogen atoms by an alkyl group.

Instead of esterifying the naphthoic acid compound with an aminoalkyl alcohol, it is possible to first esterify with an alcohol not containing an amino group, such as ethanol, and then treat the resulting ester with an amino alcohol in presence of a catalyst, such as sodium ethylate, to split off an alcohol from the ester and convert the alkyl ester into an aminoalkyl ester of an amino-substituted naphthoic acid.

The new compounds can be obtained in the form of their free amino base compounds or in the form of their salts with organic and inorganic acids, such as hydrochloric, hydrobromic, nitric, citric, tartaric, sulfuric, phosphoric and other acids. In the salts, the acid group HX (where X is an anion radical of an organic or inorganic acid), is attached to an amino nitrogen atom. The free base compounds can be recovered from their salts by treatment with basic or alkaline reagents. In those instances where one starts with the free base compound, salts can be produced either by partial or complete neutralization of the free base with a suitable acid.

The invention can be illustrated by the following examples:

EXAMPLE 1.—*3-nitro-1-naphthoyl chloride*

A mixture of 54.2 grams of 3-nitro-1-naphthoic acid and 52.0 grams of phosphorus pentachloride is heated under reflux in a bath at 120° for two hours. The phosphorus oxychloride is removed under diminished pressure and the residue, the solid acid chloride, recrystallized from 150 cc. of dry benzene. After three recrystallizations the pale yellow needles melt at 137–139°; yield, 46 grams.

Anal. calc. for $C_{11}H_6O_3NCl$: Cl, 15.07. Found: Cl, 15.05.

EXAMPLE 2.—*Hydrochloride of beta-diethylaminoethyl ester of 3-nitro-1-naphthoic acid*

To 24.0 grams of 3-nitro-1-naphthoyl chloride, suspended in 130 cc. of dry benzene, there are added 12.0 grams of beta-diethylaminoethanol. The mixture is heated for two hours on a steam bath, the semi-solid mass cooled and the benzene removed by filtration with suction. The dry hydrochloride of the ester is dissolved in 400 cc. of water (if necessary the mixture is warmed slightly), filtered, and the basic ester precipitated by the addition of sodium carbonate solution. The oily product is extracted with ether, the ether solution dried with fused sodium sulfate and then treated with a stream of dry halogen chloride. The solid, practically colorless precipitate of the hydrochloride is recrystallized from alcohol; M.P. 211–213°; yield, practically quantitative.

Anal. calc. for $C_{17}H_{21}O_4N_2Cl$: Cl, 10.06. Found: Cl, 10.04.

EXAMPLE 3.—*Mono-hydrochloride of beta-diethylaminoethyl ester of 3-amino-1-naphthoic acid*

Twenty-eight grams of stannous chloride ($SnCl_2.2H_2O$) are added to 14.0 grams of the hydrochloride of beta-diethylamino ester of 3-nitro-1-naphthoic acid, dissolved or suspended in 80 cc. of acetic acid and the mixture treated with a rapid stream of dry hydrogen chloride. The stannous chloride soon dissolves and the tin addition product of the hydrochloride of the amino compound soon precipitates in crystalline form. During the reduction process the mixture is cooled frequently in order that the temperature of the mixture does not exceed 40° C. The material is filtered on a Jena filter, washed with a small amount of acetic acid, dissolved in the smallest possible amount of water, the solution filtered, cooled with ice and treated with 10% sodium hydroxide solution. The oily base is extracted with ether, the ether solution dried with fused sodium sulfate, poured into a weighed evaporating dish and the ether removed. The calculated amount of concentrated hydrochloric acid necessary for the formation of a mono-hydrochloride is added to the oil and the mixture stirred. The product crystallizes rapidly; yield, 10 grams. The salt is recrystallized from 95% alcohol and then washed with ether; M.P. 148–150°.

Anal. calc. for $C_{17}H_{23}O_2N_2Cl$: Cl, 10.99. Found: Cl, 10.94.

EXAMPLE 4.—*4-nitro-1-naphthoyl chloride*

A mixture of 54.2 grams of 4-nitro-1- naphthoic acid (Lueck, Perkins and Whitmore, J. Am. Chem. Soc. 51, 1831 (1929), and 52.0 grams of phosphorous pentachloride is heated on a steam bath for 45 minutes. The phosphorus oxychloride is removed under diminished pressure and the crystalline acid chloride recrystallized from petroleum ether (90–100°) or distilled under greatly reduced pressure; yield, 54 grams; M.P. 96°.

EXAMPLE 5.—*Hydrochloride of beta-diethylaminoethyl ester of 4-nitro-1-naphthoic acid*

This compound is prepared in the same manner as the corresponding 3-nitro derivative described in Example 2.

From 24 grams of the acid chloride there is obtained 26 grams of the hydrochloride of the ester; M.P. 195°.

EXAMPLE 6.—*Mono-hydrochloride of beta-diethylaminoethyl ester of 4-amino-1-naphthoic acid*

A mixture of 17.6 grams of the hydrochloride of the beta-diethylaminoethyl ester of 4-nitro-1-naphthoic acid, suspended in 30 cc. of acetic acid, and 35.0 grams of stannous chloride is treated with hydrogen chloride. The material soon dissolves, but the tin double salt separates very slowly. After four or five days the precipitated material is filtered on a Jena filter, washed with acetic, dissolved in a small amount of water, treated with charcoal and filtered. The oily base is precipitated by the addition of 10% sodium hydroxide solution, extracted with ether, the ether solution dried with fused sodium sulfate and treated with hydrogen chloride. The crystalline precipitate of dihydrochloride is washed with absolute alcohol and then with dry ether. It is dissolved in water, the base precipitated by the addition of sodium carbonate solution, extracted with ether, the solution dried and the solvent removed in a weighed evaporating dish. The crystalline mono-hydrochloride is obtained by the addition of the calculated amount of concentrated hydrochloric acid to the oily base. The mono-hydrochloride is recrystallized twice from water; M.P. 214–216°.

Anal. calc. for $C_{17}H_{23}O_2N_2Cl$: Cl, 10.99. Found: Cl, 10.87.

The invention is not limited to the naphthoic acid derivatives used in the above examples. For instance 2-naphthoic acid can be used and the following derivatives can be obtained, some by direct, others by indirect, procedures: 1-nitro-2-naphthoic, 3-nitro-2-naphthoic, 4-nitro-2-naphthoic, 5-nitro-2-naphthoic, 6-nitro-2-naphthoic, 7-nitro-2-naphthoic and 8-nitro-2-naphthoic acid. The corresponding nitro- and amino-substituted derivatives are obtained when starting with these acids and using the procedures mentioned above.

The following list gives some of the new compounds, with their melting points:

*Hydrochlorides of esters of 3-nitro-1-naphthoic acids*

| No. | Ester Radical $\left(-R-N\begin{smallmatrix}R'\\R''\end{smallmatrix}\right)$ | M. P. (degrees C.) | Formula |
|---|---|---|---|
| 1 | β-diethylaminoethyl | 211–213 | $C_{17}H_{21}O_4N_2Cl$ |
| 2 | β-di-n-butylaminoethyl | 169–170 | $C_{21}H_{29}O_4N_2Cl$ |
| 3 | β-di-n-butylaminopropyl | 149–150 | $C_{22}H_{31}O_4N_2Cl$ |
| 4 | α-diethylaminopropyl | 203–204 | $C_{18}H_{23}O_4N_2Cl$ |
| 5 | α-di-n-butylaminopropyl | 148–149 | $C_{22}H_{31}O_4N_2Cl$ |

Compounds 1 and 4 were recrystallized from alcohol, compound 2 from dilute alcohol, and compounds 3 and 5 from benzene.

All of the compounds were colorless except compound 4 which was light brown.

*Mono hydrochlorides of esters of 3-amino-1-naphthoic acids*

| No. | Ester Radical $\left(-R-N\begin{smallmatrix}R'\\R''\end{smallmatrix}\right)$ | M. P. (degrees C.) | Formula |
|---|---|---|---|
| 1 | β-diethylaminoethyl | 148–150 | $C_{17}H_{23}O_2N_2Cl$ |
| 2 | β-di-n-butylaminoethyl | 135–136 | $C_{21}H_{31}O_2N_2Cl$ |
| 3 | β-di-n-butylaminopropyl | 113–114 | $C_{22}H_{33}O_2N_2Cl$ |
| 4 | α-diethylaminopropyl | 160–161 | $C_{18}H_{25}O_2N_2Cl$ |
| 5 | α-di-n-butylaminopropyl | 146–147 | $C_{22}H_{33}O_2N_2Cl$ |

Compound 1 was recrystallized from alcohol; all of the other compounds were recrystallized from a mixture of ethyl acetate and acetic acid.

Hydrochlorides of esters of 4-nitro-1-naphthoic acids

| No. | Ester Radical $\left(-R-N\begin{smallmatrix}R'\\R''\end{smallmatrix}\right)$ | M. P. (degrees C.) | Formula |
|---|---|---|---|
| 1 | β-diethylaminoethyl | 198–199 | $C_{17}H_{21}O_4N_2Cl$ |
| 2 | β-di-n-butylaminoethyl | | $C_{21}H_{29}O_4N_2Cl$ |
| 3 | β-diethylaminopropyl | 139–140 | $C_{18}H_{23}O_4N_2Cl$ |
| 4 | β-di-n-butylaminopropyl | | $C_{22}H_{31}O_4N_2Cl$ |
| 5 | α-diethylaminopropyl | 161–162 | $C_{18}H_{23}O_4N_2Cl$ |
| 6 | α-di-n-butylaminopropyl | 117–118 | $C_{22}H_{31}O_4N_2Cl$ |

Compound 1 was recrystallized from ethyl alcohol, compound 3 from ethyl acetate, compound 5 from absolute alcohol and compound 6 from benzene.

Mono hydrochlorides of esters of 4-amino-1-naphthoic acids

| No. | Ester radical $\left(-R-N\begin{smallmatrix}R'\\R''\end{smallmatrix}\right)$ | M. P. (degrees C.) | Formula |
|---|---|---|---|
| 1 | β-diethylaminoethyl | 214–216 | $C_{17}H_{23}O_2N_2Cl$ |
| 2 | β-di-n-butylaminoethyl | 170–171 | $C_{21}H_{31}O_2N_2Cl$ |
| 3 | β-diethylaminopropyl | 197–198 | $C_{18}H_{25}O_2N_2Cl$ |
| 4 | β-di-n-butylaminopropyl | 179–180 | $C_{22}H_{33}O_2N_2Cl$ |
| 5 | α-diethylaminopropyl | 184–185 | $C_{18}H_{25}O_2N_2Cl$ |
| 6 | α-di-n-butylaminopropyl | 175–176 | $C_{22}H_{33}O_2N_2Cl$ |

Compounds 1 and 3 were recrystallized from water, compound 2 from alcohol, compound 5 from absolute alcohol and compounds 4 and 6 from a mixture of ethyl acetate and acetic acid. The sulfamate corresponding to compound 1 having the formula, $C_{17}H_{25}O_5N_3S$, melts at 139–141° C.

Hydrochlorides of esters of 5-nitro-1-naphthoic acids

| No. | Ester radical $\left(-R-N\begin{smallmatrix}R'\\R''\end{smallmatrix}\right)$ | M. P. (degrees C.) | Formula |
|---|---|---|---|
| 1 | β-diethylaminoethyl | 198–199 | $C_{17}H_{21}O_4N_2Cl$ |
| 2 | β-di-n-butylaminoethyl | 131–133 | $C_{21}H_{29}O_4N_2Cl$ |
| 3 | β-diethylaminopropyl | 195–196 | $C_{18}H_{23}O_4N_2Cl$ |
| 4 | α-diethylaminopropyl | 193–194 | $C_{18}H_{23}O_4N_2Cl$ |
| 5 | α-di-n-butylaminopropyl | 118–120 | $C_{22}H_{31}O_4N_2Cl$ |

Compound 1 was recrystallized from absolute alcohol, compound 2 from water and then from benzene, compound 3 from ethyl alcohol, compound 4 from butyl alcohol and compound 5 from ethyl acetate.

Mono hydrochlorides of esters of 5-amino-1-naphthoic acids

| No. | Ester radical $\left(-R-N\begin{smallmatrix}R'\\R''\end{smallmatrix}\right)$ | M. P. (degrees C.) | Formula |
|---|---|---|---|
| 1 | β-diethylaminoethyl | 169–170 | $C_{17}H_{23}O_2N_2Cl$ |
| 2 | β-di-n-butylaminoethyl | 178.5–179.5 | $C_{21}H_{31}O_2N_2Cl$ |
| 3 | β-diethylaminopropyl | 171–172 | $C_{18}H_{25}O_2N_2Cl$ |
| 4 | α-diethylaminopropyl | 175–177 | $C_{18}H_{25}O_2N_2Cl$ |
| 5 | α-di-n-butylaminopropyl | 159–160 | $C_{22}H_{33}O_2N_2Cl$ |

Compound 1 was recrystallized from alcohol. The sulfamate corresponding to compound 2 and having the formula, $C_{21}H_{33}O_5N_3S$, melts at 118–120° C.

The compounds listed above were prepared by procedures analogous to those given for the corresponding compounds of Examples 1 to 6. In every instance, analysis of the compounds gave a percentage of chlorine almost exactly that required by theory for the empirical formula given for each hydrochloride.

The invention in its broader features includes preparation of amino alkyl esters of amino naphthoic acids wherein the carboxylic acid group, or its corresponding ester group, and the nuclear amino group are attached in any of the available relative positions around the two carbon rings of the naphthalene nucleus. For instance, the 6-amino-, 7-amino- and 8-amino-derivatives corresponding to the above listed 3-amino-, 4-amino- and 5-amino-derivatives of 1-naphthoic acid can also be made in the same manner. An example of a 6-amino-derivative is as follows:

EXAMPLE 7.—*Preparation of the beta-diethylaminoethyl ester of 6-amino-1-naphthoic acid and its intermediate nitro compound*

A. *6-nitro-1-naphthoyl chloride.*—A mixture of 20 grams of 6-nitro-1-naphthoic acid and 44 grams of thionyl chloride, purified according to the method of Fieser (Fieser, Experiments in Organic Chemistry, D. C. Heath, 1935, p. 339), is refluxed for six hours on an oil bath at 150°. At no time does the solution become homogeneous, the greater part of the acid chloride remaining insoluble in the thionyl chloride. The excess thionyl chloride is then removed on the steam bath and the product used without further purification. A small portion is recrystallized from benzene; M. P. 154–155°. The 6-nitro-1-naphthoic acid used in this preparation is obtained by the method of Leuck, Perkins and Whitmore (J. Am. Chem. Soc., 51, 1831, 1929).

Calcd. for $C_{11}H_6O_3NCl$: Cl, 15.07. Found: Cl, 14.82.

B. *Hydrochloride of β-diethylaminoethyl ester of 6-nitro-1-naphthoic acid.*—To the crude acid chloride described above, dissolved in 85 cc. of dry benzene, there is added 20 grams of diethylaminoethanol. The mixture is refluxed two hours on the steam bath, during which time the ester separates as a very dark solid. After standing fifteen hours at room temperature, the product is filtered off and washed with petroleum ether (30–60°). It is then treated with a 10% sodium carbonate solution and the free base extracted with ether and dried over fused sodium sulphate. The hydrochloride is precipitated with a stream of hydrogen chloride gas and recrystallized from absolute alcohol; M. P. 184–185°.

Calcd. for $C_{17}H_{21}O_4N_2Cl$: Cl, 10.06. Found: Cl, 10.08.

C. *Monohydrochloride of β-diethylaminoethyl ester of 6-amino-1-naphthoic acid.*—To 1.2 grams of the product obtained above, dissolved in 5 cc. of glacial acetic acid, there is added 2.4 grams of stannous chloride dihydrate. An excess of hydrogen chloride gas is passed in, keeping the mixture cooled below 45°. After standing sixteen hours, the mixture is made alkaline with 10% sodium hydroxide solution and the free base, an oil, taken up in ether and dried over fused sodium sulphate. The ether is then removed, and to the base is added the calculated amount of concentrated hydrochloric acid to make the monohydrochloride. The product crystallizes from absolute alcohol as light tan needles; M. P. 169–170°.

Calcd. for $C_{17}H_{23}O_2N_2Cl$: Cl, 10.99. Found: Cl, 11.08.

In addition to the above compounds, the following examples of preparation of branched-chain alkyl derivatives are given:

EXAMPLE 8.—*Hydrochloride of β,β-dimethyl-γ-dimethylaminopropyl ester of 4-nitro-1-naphthoic acid*

To 12 g. of 4-nitro-1-naphthoyl chloride dissolved in 65 cc. of dry benzene, there is added 6.7 g. of β,β-dimethyl-γ-dimethylaminopropanol. The amino alcohol is prepared according to the procedure of Mannich (Ber., 65, 378 (1932)), using the modification by Burger (J. Am. Chem. Soc., 60, 1536 (1938)). The mixture is refluxed four hours on the steam bath, during which time the ester separates as an oil. On cooling the oil becomes crystalline, and an additional quantity of the ester is obtained by diluting the mother liquor with petroleum ether (30–60°). The pale yellow product is recrystallized from a mixture of ethyl acetate and glacial acetic acid; M. P. 150–151°; yield 14.5 g., or 78% of the calculated amount.

Calculated for $C_{18}H_{23}O_4N_2Cl$; Cl, 9.67. Found: Cl, 9.86.

EXAMPLE 9.—*Monohydrochloride of β,β-dimethyl-γ-dimethylaminopropyl ester of 4-amino-1-naphthoic acid*

To 7.34 g. of the product obtained in Example 8, dissolved in 12 cc. of glacial acetic acid, there is added 14 g. of stannous chloride dihydrate. The mixture is cooled rapidly in order that the temperature be maintained below 45°. The clear solution is treated with a rapid stream of dry hydrogen chloride gas and the mixture cooled at intervals until no further heat of reaction is liberated. After standing two hours, the solution is made alkaline with 10% sodium hydroxide solution, and the free base, an oil, taken up in ether and dried over fused sodium sulphate. The ether is then removed, and to the base there is added the calculated amount of concentrated hydrochloric acid to make the monohydrochloride. The pale yellow product is recrystallized from alcohol; M. P. about 221° C.

Calculated for $C_{18}H_{25}O_2N_2Cl$; Cl, 10.53. Found: Cl, 10.51.

EXAMPLE 10.—*Hydrochloride of β,β-dimethyl-γ-diethylaminopropyl ester of 4-nitro-1-naphthoic acid*

To 12 g. of 4-nitro-1-naphthoyl chloride dissolved in 65 cc. of dry benzene, there is added 8 g. of β,β-dimethyl-γ-diethylaminopropanol. The amino alcohol is prepared according to the unmodified procedure of Mannich (Ber. 65, 378 (1932)). The mixture is refluxed four hours on the steam bath, during which time the ester separates as an oil. On cooling and washing with petroleum ether (30–60°), the oil becomes crystalline. The colorless product is recrystal- lized from a mixture of ethyl acetate and glacial acetic acid; M. P. 151–152°; yield 16 g., or 80% of the calculated amount.

Calculated for $C_{20}H_{27}O_4N_2Cl$; Cl, 8.98. Found: Cl, 9.07.

EXAMPLE 11.—*Monohydrochloride of β,β-dimethyl-γ-diethylaminopropyl ester of 4-amino-1-naphthoic acid*

To 7.9 g. of the product obtained in Example 10, dissolved in 12 cc. of glacial acetic acid, there is added 14 g. of stannous chloride dihydrate. The product is then reduced with hydrogen chloride gas being passed into the solution and worked up in the same manner as the product of Example 9. The monohydrochloride crystallizes from alcohol as yellow needles; M. P. 184–186°.

Calculated for $C_{20}H_{29}O_2N_2Cl$; Cl, 9.72. Found: Cl, 9.59.

EXAMPLE 12.—*Hydrochloride of β,β-dimethyl-γ-dimethylaminopropyl ester of 3-nitro-1-naphthoic acid*

This compound is prepared in the same manner as the corresponding 4-nitro ester of Example 10. The colorless product crystallizes from absolute alcohol in the form of needles; M. P. 203–204°. A small amount of material, isolated from the mother liquid by evaporation and treatment with petroleum ether, can be identified as the free base. It crystallizes from absolute alcohol in the form of yellow cubes; M. P. 114–115°.

Calcd. for $C_{18}H_{23}O_4N_2Cl$: Cl, 9.67. Found: Cl, 9.71.

EXAMPLE 13.—*Monohydrochloride of β,β-dimethyl-γ-dimethylaminopropyl ester of 3-amino-1-naphthoic acid*

This compound is prepared from the nitro ester of Example 12 in the same manner as the 4-amino analog of Example 11. The monohydrochloride is recrystallized from n-butanol and has the form of orange needles; M. P. 162–163°.

Calcd. for $C_{18}H_{25}O_2N_2Cl$: Cl, 10.53. Found: Cl, 10.44.

Some of the nitro-naphthoyl halide intermediate compounds which can be used in this invention are new compounds. For example, the following compounds have been made:

*Nitronaphthoyl chlorides*

| No. | Chloride | M. P., °C. | B. P., °C. | Formula | Calcd. | Found |
|---|---|---|---|---|---|---|
| 1 | 3-nitro-1-naphthoyl | 137–139 | 205–206/12 mm | $C_{11}H_6O_3NCl$ | 15.07 | 15.05 |
| 2 | 4-nitro-1-naphthoyl | 96 | 208–210/17 mm | $C_{11}H_6O_3NCl$ | 15.07 | 14.90 |
| 3 | 5-nitro-1-naphthoyl | 132–134 | 214–217/18 mm | $C_{11}H_6O_3NCl$ | 15.07 | 14.96 |
| 4 | 6-nitro-1-naphthoyl | 154–155 |  | $C_{11}H_6O_3NCl$ | 15.07 | 14.82 |

Compounds 1 and 4 were recrystallized from benzene, compounds 2 and 3 from petroleum ether (90–100°).

*Method of preparation of the above nitronaphthoyl chlorides*

In the case of compounds 1, 2 and 3 the nitro acid was heated with approximately three times the calculated amount of thionyl chloride (practical) in an oil bath at 150° for about five hours. A clear solution was obtained. The excess thionyl chloride was removed under diminished pressure and the crystalline residue distilled under diminished pressure. The acid chlorides can also be purified by recrystallization.

In the case of compound 4, pure thionyl chloride was used. Solid material was present in the reaction flask during the whole procedure and no complete solution was obtained.

In the final compounds, the amino group attached to the naphthalene nucleus may be attached either to the same carbocyclic ring as that to which the carboxyl group is attached or may be attached to the other ring of the naphthalene nucleus. For instance, instead of starting in Example 1 with 3-nitro-1-naphthoic acid, one can also use the corresponding 2-nitro, 4-nitro, 5-nitro, 6-nitro, 7-nitro or 8-nitro derivatives of 1-naphthoic acid, or even the corresponding nitro derivatives of an isomeric naphthoic acid, where the carboxyl group occupies one of the positions in the naphthalene nucleus other than position 1.

In forming esters of the amino-naphthoic acids or their corresponding nitro intermediates, it is not necessary to use β-diethylamino ethanol as the alcohol for reaction with the substituted naphthoic acid halide. Any other alcohol, aminoalkyl alcohol, or alkylamino alkyl alcohol may be reacted with a nitro- or aminonaphthoic acid halide or equivalent carboxylic acid derivative capable of reacting with the alcohol to give the corresponding carboxylic acid ester. By choosing a suitable aminoalkyl alcohol, the number of methylene groups between the carboxylic acid and the amino group at the other end of the alkylene chain can be given any number desired.

Although the invention in its broad sense embodies preparation of a new class of chemical substances, the preferred compounds of the invention are those included under the general formula already given for the compounds,

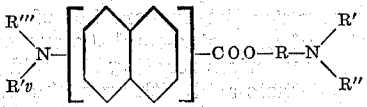

but where R is an aliphatic hydrocarbon residue, straight or branched chain, containing not more than four carbon atoms in the chain, and R', R'', R''' and R'v are the same or different members of the group hydrogen and an alkyl group, straight or branched chain, of not more than four carbon atoms. Compounds in this sub-group are of outstanding value for their physiological properties, especially their local anesthetic properties. For instance, compounds of the type,

where the R groups have the significance last given above, such as the product of Example 6, are more active anesthetics for topical application than procaine and in many cases they are more active than cocaine. In spite of their high anesthetic activities, they are of surprisingly low toxicity.

Under this formula, which is for compounds having a nuclear unsubstituted amino group, is a class of compounds which includes many of the more effective anesthetics and which may be represented by the formula,

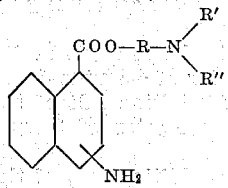

where R is an alkyl residue and R' and R'' are alkyl groups, R, R' and R'' each containing not more than 4 carbon atoms. In these compounds the unsubstituted amino group ($-NH_2$) is attached to the same 6-membered carbocyclic nucleus as the carboxylic acid group and is also attached to the No. 3 or No. 4 carbon atoms. These are the only available carbon atoms of said nucleus not adjacent to the carbon atom to which the carboxylic acid group is attached.

A few examples of compounds which can be made in accordance with the invention are, the β-diethylaminoethyl esters of 2-amino-, 5-amino-, 6-amino-, 7-amino-, and 8-amino-1-naphthoic acids and the β-dibutyl aminoethyl esters of these same amino naphthoic acids, as well as their γ-diethyl aminopropyl- and γ-dibutyl aminopropyl- esters. Other examples are the corresponding esters of amino naphthoic acids with the carboxylic acid group in position 2 in the naphthalene ring.

The invention not only includes new anesthetic products but also provides new chemical substances, especially in their substantially chemically pure crystalline forms capable of practical therapeutic use.

The anesthetic substances of this invention can be used either alone or in combinations with other therapeutically useful substances, such for example as vaso-constrictors like adrenalin or epinephrine, with or without buffer salts and other ingredients.

Compounds coming within the purview of the invention are the free amino base compounds and their salts with various organic and inorganic acids, such as citric, tartaric, sulfuric, sulfamic ($HO-SO_2-NH_2$), lactic, boric and other acids. There are two amino groups present in each of the final compounds and the invention includes not only the mono-salts of the free amine bases, containing one equivalent of acid to one of the base, but also the salts wherein two equivalents of acid are combined with one of the amine. For example, all of the mono-hydrochlorides of the amino naphthoic acids listed above can be prepared in the form of their di-hydrochlorides by using a second equivalent of hydrochloric acid.

What I claim as my invention is:

1. Aminoalkyl esters of amino-naphthalene carboxylic acids and their acid addition salts represented by the following formula for the esters,

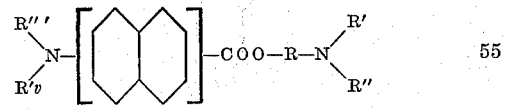

where R is a lower alkylene group and R', R'', R''' and R'v are members of the group hydrogen and an alkyl radical containing not more than 4 carbon atoms.

2. Aminoalkyl esters of amino-naphthalene carboxylic acids and their acid addition salts represented by the following formula for the esters,

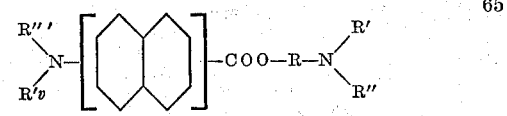

where R is an alkylene group containing not more than 4 carbon atoms and R', R'', R''' and R'v are members of the group hydrogen and an alkyl radical containing not more than 4 carbon atoms.

3. Aminoalkyl esters of amino-naphthalene carboxylic acids and their acid addition salts represented by the following formula for the esters,

where R is a lower alkylene group and R' and R'' are members of the group hydrogen and an alkyl radical containing not more than 4 carbon atoms.

4. Aminoalkyl esters of amino-naphthalene-1-carboxylic acids and their acid addition salts represented by the following formula for the esters,

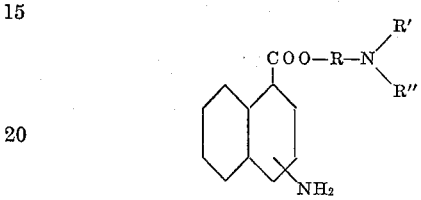

where R is an alkylene group of not more than 4 carbon atoms and R' and R'' are members of the group hydrogen and an alkyl radical containing not more than 4 carbon atoms.

5. A salt of an aminoalkyl ester of amino-naphthalene-1-carboxylic acid represented by the following formula,

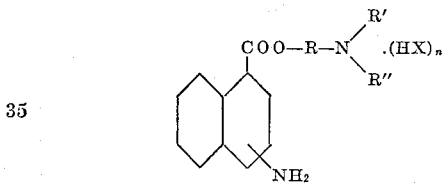

where R is an alkylene group of not more than 4 carbon atoms and R' and R'' are members of the group hydrogen and an alkyl radical containing not more than 4 carbon atoms, X is the anion group of an acid, and $n$ is a whole number not greater than 2.

6. Aminoalkyl esters of amino-naphthalene-1-carboxylic acids and their hydrochloric acid addition salts represented by the following formula for the esters,

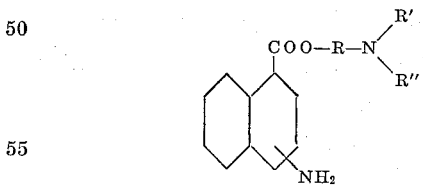

where R is an alkylene group of not more than 4 carbon atoms and R' and R'' are members of the group hydrogen and an alkyl radical containing not more than 4 carbon atoms.

7. Gamma-di-n-butylaminopropyl esters of amino-naphthalene-1-carboxylic acids and their acid addition salts represented by the following formula for the esters,

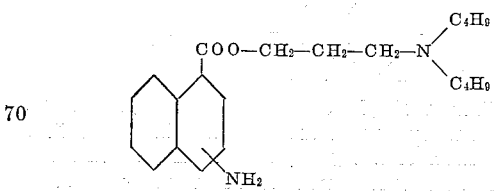

8. The beta-di-ethylaminoethyl ester of 4-amino-1-carboxylic acid and its acid addition salts represented by the following formula for the ester,

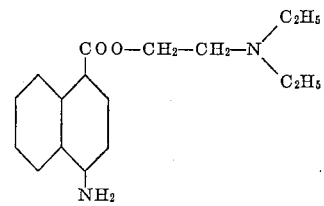

9. As new anesthetics, the mono-hydrochlorides of amino-napthalene-1-carboxylic acid aminoalkyl esters represented by the following formula,

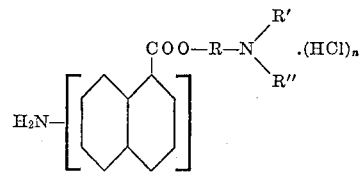

where R is an alkylene group of not more than 4 carbon atoms and R' and R'' are members of the group hydrogen and an alkyl radical containing not more than 4 carbon atoms, $n$ being a whole number not greater than 2.

10. As an anesthetic substance, the mono-hydrochloride of the beta-diethylaminoethyl ester of 4-amino-1-naphthoic acid.

11. As an anesthetic substance, the mono-hydrochloride of the gamma-di-n-butylaminopropyl ester of 3-amino-1-naphthoic acid.

12. As an anesthetic substance, the mono-hydrochloride of the gamma-di-n-butylaminopropyl ester of 4-amino-1-naphthoic acid.

13. Process for the preparation of an aminoalkyl ester of an amino-naphthalene carboxylic acid which comprises reacting the acid halide of a nitro-naphthoic acid with an amino-alkanol to form a nitro-naphthoic ester and reducing the nitro group of the latter to an amino group.

14. Process for the preparation of a dialkyl aminoalkyl ester of an amino-substituted 1-naphthoic acid which comprises reacting an acid halide of a nitro-substituted 1-naphthoic acid with a dialkyl aminoalkanol to form a nitro-naphthoic ester and reducing the nitro group of the latter to an amino group.

15. Process for the preparation of the gamma-di-n-butylaminopropyl ester of 3-amino-1-naphthoic acid which comprises reacting 3-nitro-1-naphthoic acid halide with gamma-di-n-butylaminopropanol to form the gamma-di-n-butylaminopropyl ester of 3-nitro-1-naphthoic acid and reducing the nitro group of the latter to an amino group.

16. An acid addition salt of an aminoalkyl ester of amino-naphthalene carboxylic acid represented by the following formula for the ester

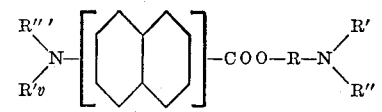

where R is a lower alkylene group and R', R'', R''' and R4 are members of the group hydrogen and an alkyl radial containing not more than 4 carbon atoms.

17. An acid addition salt of the beta-diethylaminoethyl ester of 4-amino-1-naphthoic acid.

18. An acid addition salt of the gamma-di-n-butylaminopropyl ester of 3-amino-1-naphthoic acid.

19. An acid addition salt of the gamma-di-n- butylaminopropyl ester of 4-amino-1-naphthoic acid.

20. Process for the preparation of an aminoalkyl ester of an amino-naphthalene carboxylic acid which comprises converting a nitro-naphthoic acid into its acid halide with a halogenating agent, reacting the acid halide with an aminoalkanol to form a nitro-naphthoic acid ester, reducing the nitro group of the latter to an amino group with production of an aminoalkyl ester of an amino-naphthalene carboxylic acid and adding a quantity of acid to form an acid addition salt with the latter ester.

21. Process for the preparation of a dialkyl aminoalkyl ester of an amino-substituted-1-naphthoic acid which comprises converting a nitro-substituted-1-naphthoic acid into its acid halide with a halogenating agent, reacting the acid halide with a dialkyl aminoalkanol to form a nitro-naphthoic acid ester, reducing the nitro group of the latter to an amino group with production of the dialkyl aminoalkyl ester of an amino-substituted-1-naphthoic acid and adding a quantity of acid to form an acid addition salt with the latter ester.

22. Process for the preparation of the beta-diethylaminoethyl ester of 4-amino-1-naphthoic acid which comprises converting 4-nitro-1-naphthoic acid into its acid halide with a halogenating agent, reacting the acid halide with beta-diethylaminoethyl ethanol to form a beta-diethylaminoethyl ester of 4-nitro-1-naphthoic acid, reducing the nitro group of the latter to an amino group with production of a beta-diethylaminoethyl ester of 4-amino-1-naphthoic acid and adding a quantity of acid to form an acid addition salt with the latter ester.

23. Process for the preparation of an acid addition salt of gamma-di-n-butylaminopropyl ester of 3-amino-1-naphthoic acid which comprises converting 3-nitro-1-naphthoic acid into its acid halide with a halogenating agent, reacting said acid halide with gamma-di-n-butylaminopropanol to form the gamma-di-n-butylaminopropyl ester of 3-nitro-1-naphthoic acid, reducing the nitro group of the latter to an amino group and adding a quantity of acid to form an acid addition salt with the latter ester.

FREDERICK F. BLICKE.